US00RE43395E

(19) United States
(12) Reissued Patent
Budda

(10) Patent Number: US RE43,395 E
(45) Date of Reissued Patent: May 22, 2012

(54) PROTECTIVE GEAR FOR A LIMB

(76) Inventor: Chris Budda, Campbell River (CA)

(21) Appl. No.: 11/520,062

(22) Filed: Sep. 13, 2006

Related U.S. Patent Documents

Reissue of:
(64) Patent No.: 6,789,264
Issued: Sep. 14, 2004
Appl. No.: 10/470,799
PCT Filed: Feb. 18, 2002
PCT No.: PCT/CA02/00218
§ 371 (c)(1),
(2), (4) Date: Aug. 31, 2003
PCT Pub. No.: WO02/066122
PCT Pub. Date: Aug. 29, 2002

(30) Foreign Application Priority Data

Feb. 20, 2001 (CA) ..... 2337566

(51) Int. Cl.
*A41D 13/00* (2006.01)
(52) U.S. Cl. ..... 2/22
(58) Field of Classification Search ..... 2/22–24, 2/16, 62, 911; 602/16, 20, 23, 26
See application file for complete search history.

(56) References Cited

U.S. PATENT DOCUMENTS

| | | | | |
|---|---|---|---|---|
| 1,931,524 | A | 10/1933 | Becket | |
| 4,409,689 | A | 10/1983 | Buring et al. | |
| 4,884,561 | A | 12/1989 | Letson | |
| 5,172,425 | A | 12/1992 | Smith | |
| 5,652,956 | A | 8/1997 | Hoshizaki et al. | |
| 5,662,594 | A | 9/1997 | Rosenblatt | |
| 5,794,261 | A | 8/1998 | Hefling | |
| 6,305,031 | B1 * | 10/2001 | White | 2/455 |
| 7,363,846 | B1 * | 4/2008 | Dean et al. | 89/36.05 |

* cited by examiner

*Primary Examiner* — Tejash Patel
(74) *Attorney, Agent, or Firm* — Smiths IP

(57) ABSTRACT

A protective body guard (10) providing a full range of motion that closely tracks the biomechanical movement of a joint. The device provides protection against sharp objects, impact and limb movement into positions that may cause injury. The device (10) comprises successive segments (12, 14, 16, 18, 20, 22) made of a hard, impact-resistant, light material and arranged in overlapping fashion and interconnected by means of a single pivot pin (28) or flexible strap in an arcuate slot (30) at each side of the segments. Cushioning pads (24, 26), detachably fixed to the segments (12, 22), provide protection from contact with the interior of the segments.

39 Claims, 3 Drawing Sheets

PROTECTIVE GEAR FOR A LIMB

Matter enclosed in heavy brackets [ ] appears in the original patent but forms no part of this reissue specification; matter printed in italics indicates the additions made by reissue.

FIELD OF THE INVENTION

This invention relates to protective body gear. In particular this invention relates to articulated body gear for protecting joints against injury from sharp objects.

BACKGROUND OF THE INVENTION

Many types of activities require the use of protective covering to guard a user's body against the impact of potentially damaging objects. Generally speaking, the covering material for the protective gear should be hard or resilient to withstand impact and sharp objects, the gear should be shaped to correspond to the shape of the body parts to be protected, and the gear should be articulated for unrestricted movement of the limbs.

Sports-oriented protective body guards are well known. U.S. Pat. No. 5,794,261 to Hefling discloses protective gear for contact sports, which comprises a plurality of interlocking segments. Each segment comprises an upper part and a lower part. Adjacent segments are made to overlap such that the upper part of one segment overlays the lower part of the adjacent segment. Adjacent segments are interconnected by means of holes in their lateral posterior portions. The holes are aligned when the adjacent segments are overlapped and a pivot pin extends through the holes on both overlapping segments. This allows adjacent segments to pivot in relation to one another and to allow the upper part of one segment to slide over the lower part of the adjacent segment. Hefling also discusses the provision of elongated slots in the lateral posterior portion of the segments and stop pins extending through the slots and into holes in the adjacent segment.

The Hefling design enables flexing and extension of the joint. However, most joints have a more complex mode of articulation than simply flexing and extension. For example, many members may also rotate about their joint, which the Hefling design does not accommodate despite Hefling's stated object of achieving a full range of motion. In some cases, a full range of unrestricted joint motion over its several types of movement is extremely important. This is the case for example for tree fellers who need unrestricted joint movement while climbing and felling trees using heavy chain saws, for various sports, and for other activities.

There is therefore still a need for a protective body guard which provides a full range of motion that tracks more closely the bio-mechanical movement of a joint, while still ensuring continual coverage of the body parts and protection against such sharp objects as the blades of chain saws and other power tools, and protection against falls onto sharp objects and abrasive surfaces.

SUMMARY OF THE INVENTION

The present invention consists of protective gear for a leg or an elbow that closely emulates the various movements of the joint. This ensures that the user is able to move the limbs in a relatively unrestricted manner, while still being protected from blows.

According to the invention, successive segments are arranged in overlapping fashion and are interconnected by means of a single pivot element in an arcuate slot at each side of the segments. The slot is angled in relation to the longitudinal axis of the extended limb. This allows the successive segments to not only flex and extend, but also to rotate along with the limb and joint the gear protects. The protective gear according to the invention also accommodates sliding, for example when the femur sliding forward and backward on the tibia.

In one of its aspects, the invention comprises protective gear for a jointed limb comprising a plurality of partially overlapping, substantially rigid, segments. Each segment is adapted to articulate in relation to the next adjacent segment to selectively flex and extend substantially along a longitudinal axis and to undergo limited rotation about the longitudinal axis in relation to the other segments. Articulation between adjacent segments is accomplished by way of a single pivot element on opposite sides of each segment, which extends through an arcuate slot located in the adjacent segment.

In another aspect of the invention, the tangent to the center point of the arcuate slot defines an angle of between 10 and 65 degrees, and preferably between 40 and 50 degrees, in relation to the longitudinal axis of the extended gear.

In other aspects of the invention, the arc length of the slot is between 15 mm and 25 mm and the slot has a radius of curvature of between 20 and 55 mm.

In yet another aspect of the invention, the arcuate slot is located in the superior posterior portion of the segment and the pivot element is located in apertures in the inferior posterior portions of the segments.

In yet a further aspect of the invention, the arcuate slot is spaced between one half inch and one and a half inches from the lateral edge of the segment.

Other aspects of the invention will be appreciated by reference to the detailed description of the preferred embodiment and to the claims that follow.

BRIEF DESCRIPTION OF THE DRAWINGS

The preferred embodiment will be described by reference to the drawings thereof in which.

DETAILED DESCRIPTION OF THE PREFERRED EMBODIMENT OF THE INVENTION

Figure 1:
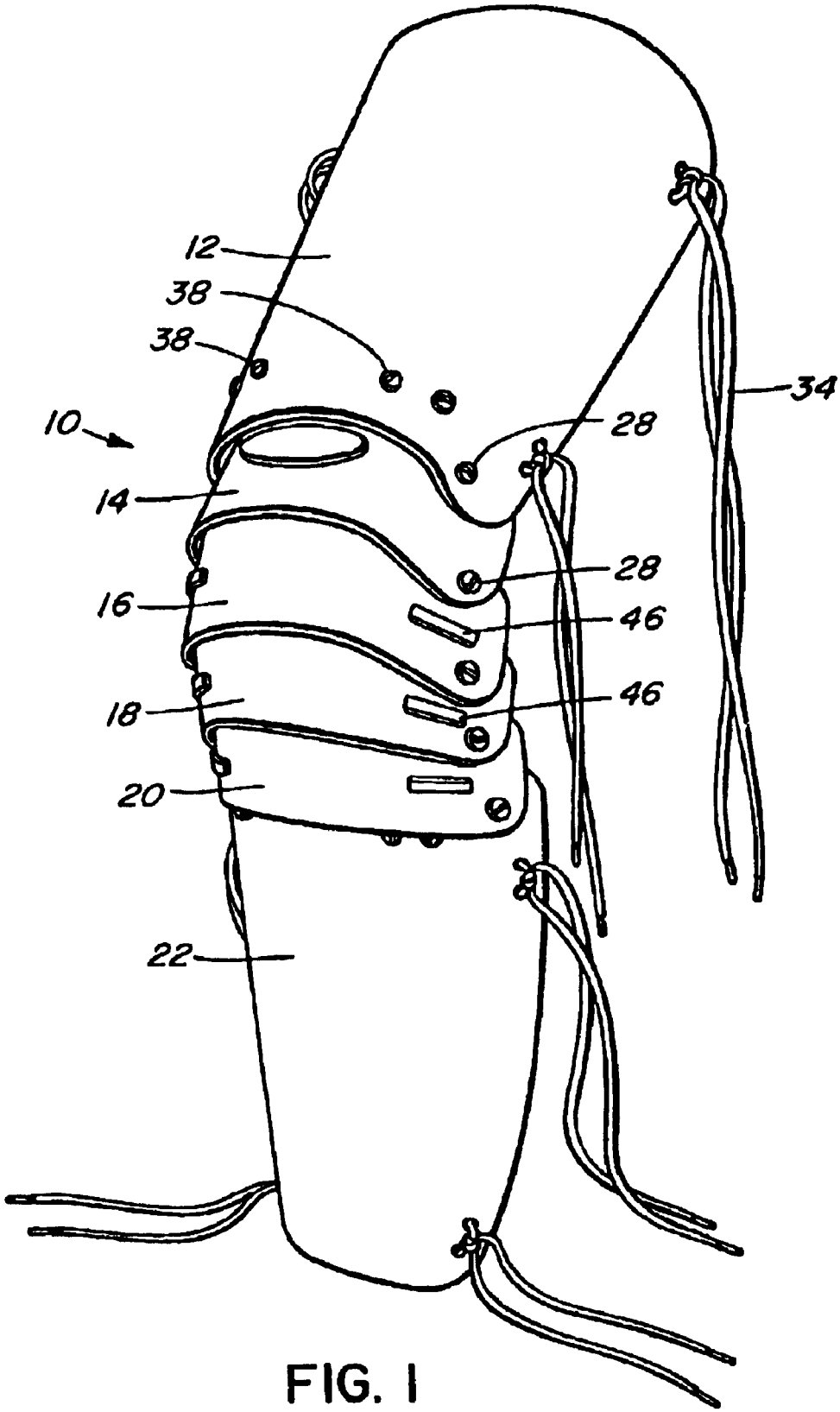
FIG. 1 is a perspective view of the assembled leg and knee guard according to the preferred embodiment of the invention.

Referring to FIG. 1, there is shown a leg and knee guard 10 according to the invention. Guard 10 comprises generally a shaped thigh segment 12, smaller intermediate segments 14, 16, 18, 20 and a shaped shin segment 22. The segments 12-22 are interconnected as described below.

Figure 2:
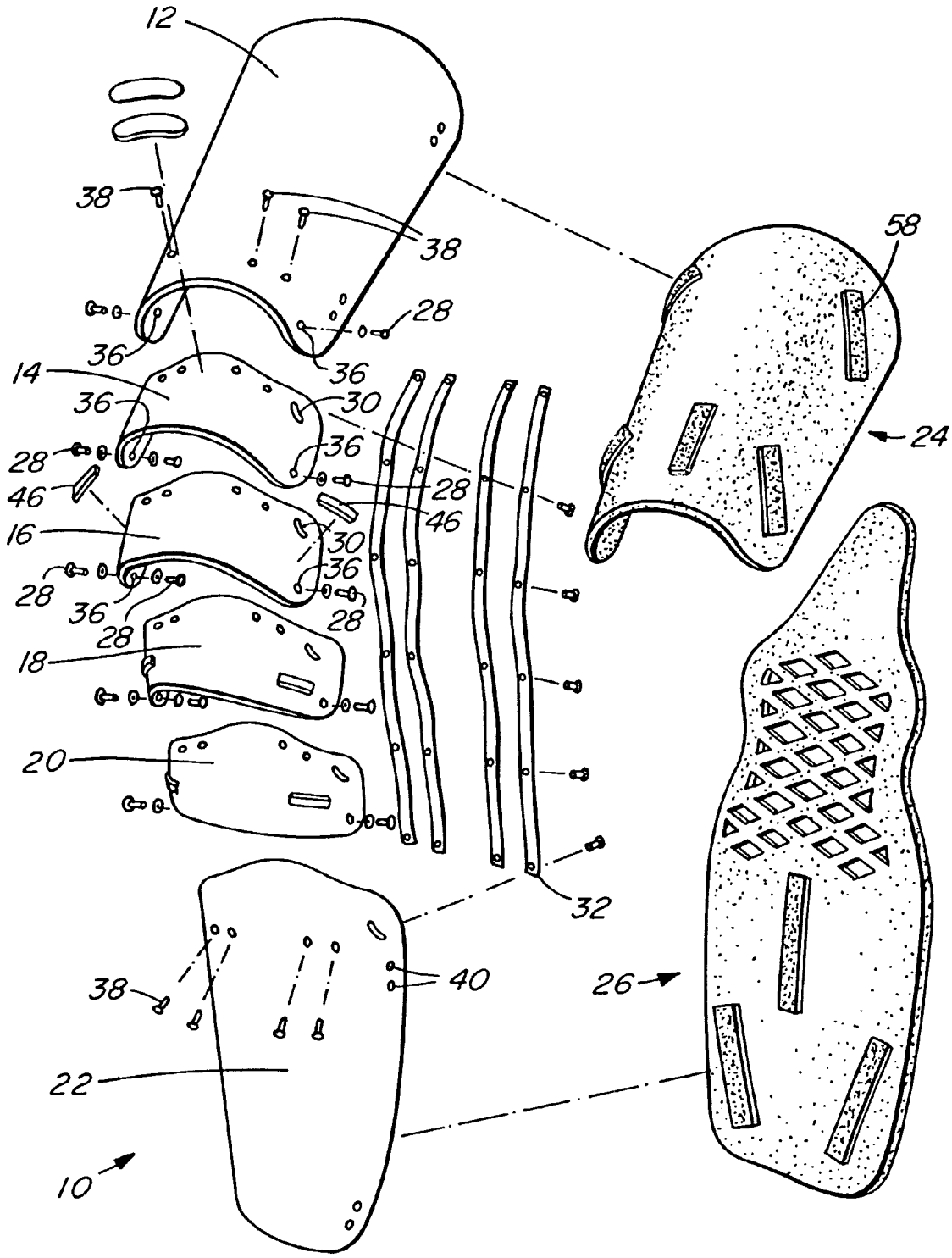
FIG. 2 is an exploded perspective view of the components of the leg and knee guard.

Referring to FIG. 2, two cushioning pads 24, 26 are attached to the inside of segments 12 and 22 respectively, but pad 26 extends to underlay segments 14, 16, 18 and 20 as well.

Successive segments 12 to 22 are interconnected by combination pins 28 that extend through holes 36 at the inferior posterior portions of each segment and slightly arcuate slots 30 located at the superior posterior portions of the next adjacent segment. Dacron straps 32 and strings 34 are also provided as discussed below.

Segments 12-22 are made of a hard, impact-resistant but light material. The design of the pivot/slot arrangement (defined by pins 28, holes 36 and slots 30) enables the segments and the overall body guard to closely follow and emulate the biomechanical behaviour of the leg and knee. The overall arrangement of the invention provides six degrees of freedom and allows rotation of the segments about each of the three main axes.

Figure 3:
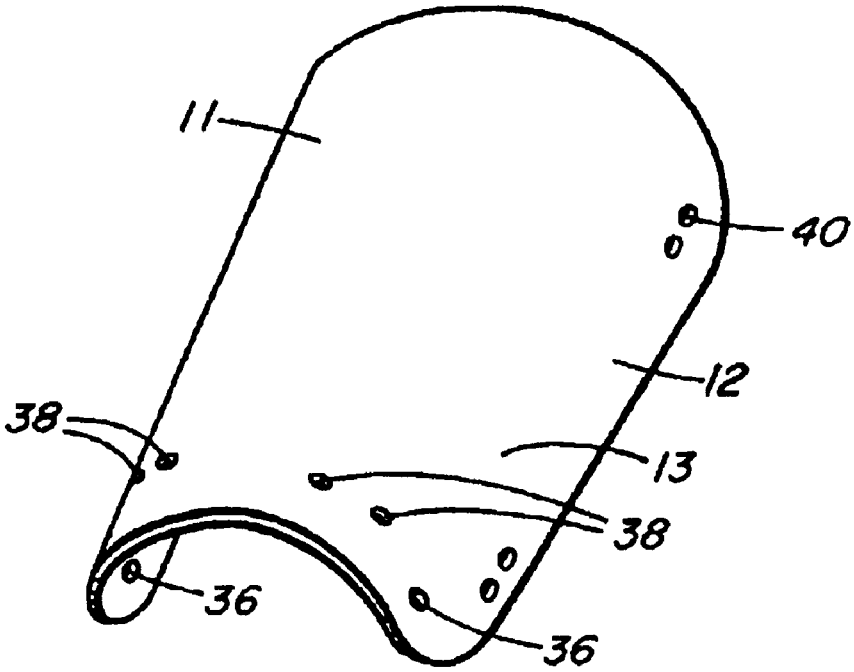
FIG. 3 is a perspective view of a thigh segment.
Figure 4:
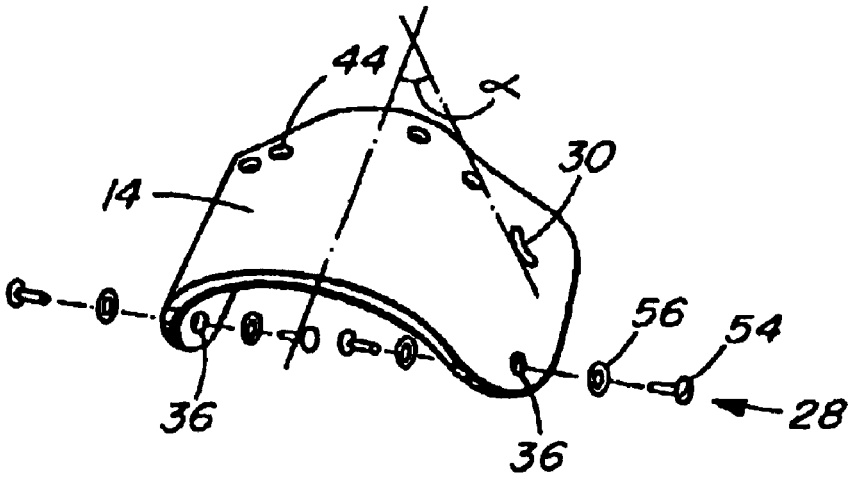
FIG. 4 is a perspective view of one of the intermediate segments.

FIG. 3 illustrates a thigh segment 12 while FIG. 4 illustrates intermediate segment 14. The interconnection of successive segments will be described by reference to the interconnection of segments 12 and 14, it being understood that successive segments are interconnected in substantially the same way, save for possible variations to accommodate particular joint or member articulation characteristics or shapes.

Circular holes 36 are provided in the inferior posterior portions of each segment. Holes 36 receive combination pivot pins 28 that also extend through arcuate slots 30 that are provided in the superior posterior portions of the next adjacent segment. Thus a pin 28 extends through hole 36 of segment 12 and through slot 30 of segment 14.

Two holes 36 of each segment are located across from each other at the lower left-hand corner and lower right-hand corners of the segment. This creates an axis of movement between them.

The width of slots 30 is slightly larger than the width of the combination pivot pins 28 to allow the pins 28 to slide smoothly along the slots. The arc length of the slot in the preferred embodiment is about 20 mm and the radius of curvature is about 30 mm. It is contemplated that arc lengths of between 15 mm and 25 mm and radii of curvature between 20 mm and 55 mm will be functional and within the scope of the invention.

The center tangent to each slot defines an angle to the longitudinal axis of the leg (i.e. at an angle to the longitudinal axis of the extended guard). While a variety of angles between 10 and 65 degrees will substantially accomplish the objective of allowing freedom of movement in several dimensions, the preferred angle is about 45 degrees. This arrangement allows movement of adjoining segments 12, 14, 16, 18, 20 22 to accommodate a full range of motion of a human leg and knee, i.e., bending, flexing and extension, and rotation. Flexure and extension is provided by rotation of pin 28 in the slot (without necessarily involving any sliding along the slot). Some rotation between successive segments is also provided by the sliding of the pins 28 along the slots 30, provided the slots are angled to the vertical/longitudinal to allow some lateral travel of the pin 28 in relation to the longitudinal axis of the elongated body guard. As most rotation of a leg or arm about a joint is done while also flexing or extending, the angled slot is well adapted to accommodate both types of movement simultaneously and efficiently. This same angle of the slot to the vertical/longitudinal also allows a degree of sliding of the member on the joint in the posterior-anterior direction.

The specific position of the apertures 36 and slots 30 in relation to the segments on which they are provided also plays a role in allowing freedom of movement between the segments. When successive segments are substantially identical in size and shape, placing the apertures and slots too far laterally on the segments may result in close contact between interconnected segments along the whole portion of their surfaces that are overlapping. The resulting friction would restrict relative flexing movement between them. Ideally when the guard is fully extended (unflexed), an overlap spacing is provided between the center portions of adjacent segments to allow unrestricted flexing. Accordingly the apertures and slots are provided at a somewhat recessed location in relation to the lateral sides of the segments. The degree of recess will depend principally on the degree of curvature of the segment and the degree of anticipated flexing. However in the preferred embodiments contemplated for leg and knee guards and arm and elbow guards, the apertures and slots are preferably recessed between about one half of an inch and one and a half inches from the lateral side edge of the segments.

Four pins 38 are also provided in the middle portions of segments 12 and 22 to secure Dacron straps 32 that extend to loosely interconnect successive segments when the guard is not flexed. The Dacron straps 32 are connected to the successive segments by way of rivets placed in the middle holes 44 of said successive segments. The length and looseness of the straps 32 is selected to limit the maximum flexure of the guard. The flexing of the guard results in a tightening of the straps 32 to limit further flexing. This provides support for the joint and also prevents the introduction of a gap between segments from over-flexing.

Additional apertures 40 are provided on selected segments (in this case on the thigh segment 12 and the shin segment 22) to receive strings 34 that are used to tie the protective gear to the user's thigh and shin. Cushioning pads 24 and 26 are secured to the inside surface of selected segments by means of hook and loop type fasteners 58.

In one embodiment of the invention, thigh segment 12 further includes an elongated slot near the uppermost edge thereof. The elongated slot is used to receive a belt, strap or buckle used for securing the top of the protective gear to clothing worn by the user. The elongated slot allows lateral movement of the thigh segment 12 in relation to the clothing. This serves to accommodate the relative twisting between the protective gear (in particular the thigh segment 12) and the thigh of the user during twisting of the leg.

Intermediate segments 16, 18 and 20 are identical to the segment 14 in size and shape as well as in the locations and sizes of apertures and slots except they also include a pair of brake slats 46. Brake slats 46 serve to restrict over-extension of the adjacent segments.

The apertures 36 and the slots 30 are located such that when pins 28 extend through them, the adjacent segments partially overlap one to ensure continuous coverage of the joint or member over which the segments lie.

In the preferred embodiment, each combination pivot pin 28 consists of a pair of opposed mating pins 54 and Teflon washers 56. Combination pivot pins 28 can be easily removed to replace segments as required. Alternatively the pins 28 can be formed integrally with the segments. A cap, lock nut or other equivalent element can be secured to the tip of the pin after assembly of adjacent segments.

In an alternative embodiment, combination pins 28 may be replaced by flexible straps. In one version of the strap embodiment, each combination pin 28 is replaced by a flexible strap. The straps may be secured to a segment by threading it through a pair of closely parallel apertures or slots on the segment, such parallel anchoring apertures or slots corresponding to holes 36 of the preferred embodiment. The strap may have a flat lateral extent that is able to extend along a portion of the slot 30 and to slide laterally along the slot. In another version of the strap embodiment, the plurality of combination pins 28 on one side of the protective gear are all replaced by a single flexible strap that is threaded through the anchoring apertures or slots and arcuate slots 30 of successive segments.

The inventor has found that the use of straps has the advantage of reduced noise during movement and flexure of the protective gear. Provided the strap is narrower than the length of the arcuate slot 30 and can travel along the slot, the strap effectively provides at least the same freedom of movement as the combination pins of the preferred embodiment. The strap embodiment also obviates the need for Dacron straps 32.

It will be appreciated that while the invention has been described by reference to the presently contemplated preferred and alternative embodiments thereof, certain modifications and variations thereto may be practised without departing from the spirit and scope of the invention.

What is claimed is:

1. Protective gear for a jointed limb comprising a *pair of spaced limb guards and a* plurality of partially *and successively* overlapping, substantially rigid, segments *extending between said limb guards*, each of said segments being adapted to articulate in relation to the next adjacent segment to selectively flex and extend substantially along a longitudinal axis and to undergo limited rotation about said longitudinal axis in relation to others of said segments, said articulation between a given segment and the next adjacent segment being accomplished by means at opposed sides of each of said segments, each of said means comprising an arcuate slot in said given segment and a single pivot element associated with said next adjacent segment, said pivot element extending through said arcuate slot.

2. Protective gear as in claim 1 wherein said pivot element is a pivot pin.

3. Protective gear as in claim 1 or 2 wherein said pivot element is integrally formed with said next adjacent segment.

4. Protective gear as in claim 1 wherein said arcuate slot has a center point the tangent to which defines an angle of between 10 and 65 degrees in relation to said longitudinal axis.

5. Protective gear as in claim 4 wherein said angle is between 40 and 50 degrees.

6. Protective gear as in claim 1 wherein the arc length of the arcuate slot is between 15 mm and 25 mm.

7. Protective gear as in claim 6 wherein said arc length is about 20 mm.

8. Protective gear as in claim 1 wherein said arcuate slot has a radius of curvature of between 20 and 55 mm.

9. Protective gear as in claim 8 wherein said radius is about 30 mm.

10. Protective gear as in claim 4 or 5 wherein said pivot element is a pivot pin.

11. Protective gear as in claim 1 wherein said protective gear is a leg and knee guard, *and* said [protective gear further including] *limb guards are* a shaped thigh [segment] *guard* and a [shaped] shin [segment] *guard*.

12. Protective gear as in claim 7 further comprising at least one cushioning pad extending under at least two of said segments.

13. Protective gear as in claim 7 wherein said pivot elements are pivot pins extending through apertures in the inferior posterior portions of said segments and said arcuate slots are formed in the superior posterior portions of said segments.

14. Protective gear as in claim 9 wherein said apertures and said arcuate slots are spaced in relation to the lateral edges of said segments.

15. Protective gear as in claim 10 wherein said spacing is between one half inch and one and a half inches.

16. Protective gear as in claim 11 further comprising at least two straps each of said straps being secured to at least two of said segments.

17. Protective gear as in claim 1, 4, 5, 6 or 7 wherein said pivot element is a strap of flexible material.

18. Protective gear as in claim 7 wherein said pivot elements are flexible straps extending through apertures in the inferior posterior portions of said segments and said arcuate slots are formed in the superior posterior portions of said segments.

19. Protective gear as in claim 18 wherein a single flexible strap is threaded through the apertures and arcuate slots of successive segments on each side of said gear.

*20. Protective gear for a jointed limb comprising a pair of spaced limb guards and a plurality of partially and successively overlapping, substantially rigid, segments extending between said limb guards, each of said segments being adapted to articulate in relation to the next adjacent segment to selectively flex and extend substantially along a longitudinal axis and to undergo limited rotation about said longitudinal axis in relation to others of said segments, said articulation between a given segment and the next adjacent segment being accomplished by means at opposed sides of each of said segments, each of said means comprising an aperture in said given segment, said aperture having an arcuate edge, and a single pivot element associated with said next adjacent segment, said pivot element extending through said aperture.*

*21. Protective gear as in claim 20 wherein said arcuate edge has a center point the tangent to which defines an angle of between 10 and 65 degrees in relation to said longitudinal axis.*

*22. Protective gear as in claim 21 wherein said angle is between 40 and 50 degrees.*

*23. Protective gear as in claim 20 wherein the arc length of the arcuate edge is between 15 mm and 25 mm.*

*24. Protective gear as in claim 23 wherein said arc length is about 20 mm.*

*25. Protective gear as in claim 20 wherein said arcuate edge has a radius of curvature of between 20 and 55 mm.*

*26. Protective gear as in claim 25 wherein said radius is about 30 mm.*

*27. Protective gear as in claim 21 or 22 wherein said pivot element is a pivot pin.*

*28. Protective gear as in claim 20 wherein said protective gear is a leg and knee guard, and said limb guards are a shaped thigh guard and a shin guard.*

*29. Protective gear as in claim 24 further comprising at least one cushioning pad extending under at least two of said segments.*

*30. Protective gear as in claim 24 wherein said pivot elements are pivot pins extending through apertures in the inferior posterior portions of said segments and said apertures having an arcuate edge are formed in the superior posterior portions of said segments.*

*31. Protective gear as in claim 26 wherein said apertures and said apertures having an arcuate edge are spaced in relation to the lateral edges of said segments.*

*32. Protective gear as in claim 28 further comprising at least two straps each of said straps being secured to at least two of said segments.*

*33. Protective gear for a jointed limb comprising a pair of limb guards and a plurality of partially and successively overlapping, substantially rigid, segments extending between said limb guards, each of said segments being adapted to articulate in relation to the next adjacent segment to selectively flex and extend substantially along a longitudinal axis and to undergo limited rotation about said longitudinal axis in relation to others of said segments, said articulation between a given segment and the next adjacent segment being accomplished by means at opposed sides of each of said*

*segments, each of said means comprising an aperture in said given segment and a single pivot element associated with said next adjacent segment, said pivot element extending through said aperture, said aperture having dimensions relative to said pivot element that allow arcuate motion of said pivot element in said aperture.*

*34. Protective gear as in claim 33 wherein said pivot element is a pivot pin.*

*35. Protective gear as in claim 33 wherein said protective gear is a leg and knee guard, said limb guards comprising a shaped thigh guard and a shaped shin guard.*

*36. Protective gear as in claim 33 further comprising at least one cushioning pad extending under at least two of said segments.*

*37. Protective gear as in claim 33 wherein said pivot elements are pivot pins extending through apertures in the inferior posterior portions of said segments and said apertures in said given segments are formed in the superior posterior portions of said segments.*

*38. Protective gear as in claim 33 wherein said apertures and said apertures in said given segments are spaced in relation to the lateral edges of said segments.*

*39. Protective gear as in claim 35 further comprising at least two straps each of said straps being secured to at least two of said segments.*

* * * * *